United States Patent
Birrell

[15] 3,678,025
[45] July 18, 1972

[54] PREPARATION OF LINEAR ALPHA OLEFIN POLYMERS HAVING BROAD MOLECULAR WEIGHT DISTRIBUTIONS

[72] Inventor: George B. Birrell, Eugene, Oreg.

[73] Assignee: The Dow Chemical Company, Midland, Mich.

[22] Filed: May 22, 1970

[21] Appl. No.: 39,890

[52] U.S. Cl. ............260/94.9 E, 252/429 C, 260/85.3, 260/88.2, 260/93.5, 260/93.7
[51] Int. Cl. ...................................C08f 1/56, C08f 3/06
[58] Field of Search............260/93.7, 94.9 B, 94.9 E

[56] References Cited

UNITED STATES PATENTS

| | | | |
|---|---|---|---|
| 3,051,690 | 8/1962 | Vandenberg | 260/88.2 |
| 3,073,811 | 1/1963 | Notta et al. | 260/93.7 |
| 3,113,115 | 12/1963 | Ziegler et al. | 260/94.9 |
| 3,230,208 | 1/1966 | Cooner et al. | 260/93.7 |
| 3,509,117 | 4/1970 | Rust et al. | 260/94.9 |
| 3,288,769 | 11/1966 | Cooper et al. | 260/88.2 |
| 3,308,112 | 3/1967 | Ludlum | 260/94.9 |
| 3,066,126 | 11/1962 | Porter et al. | 260/94.3 |

FOREIGN PATENTS OR APPLICATIONS

| | | |
|---|---|---|
| 785,314 | 10/1957 | Great Britain |
| 837,251 | 6/1960 | Great Britain |

*Primary Examiner*—Joseph L. Schofer
*Assistant Examiner*—Edward J. Smith
*Attorney*—Griswold and Burdick, R. G. Waterman, L. J. Dankert and M. S. Jenkins

[57] ABSTRACT

Linear alpha olefin polymers having controlled broad molecular weight distributions are prepared by an improved process in which a zirconium catalyst composition, e.g., the reaction product of zirconium tetrachloride and aluminum triethyl, and another transition metal catalyst composition, e.g., the reaction product of vanadium oxytrichloride and aluminum triethyl, are introduced into a polymerization zone containing an alpha olefin in an inert organic solvent and the alpha olefin is subsequently polymerized at temperatures sufficient to maintain the resulting alpha olefin polymer in solution. Such alpha olefin polymers are found to have a wider variety of uses, e.g., from cable jacketing to bottle blowing applications, than alpha olefin polymers produced by conventional low pressure polymerization.

14 Claims, No Drawings

PREPARATION OF LINEAR ALPHA OLEFIN POLYMERS HAVING BROAD MOLECULAR WEIGHT DISTRIBUTIONS

BACKGROUND OF THE INVENTION

This invention relates to improved low pressure polymerization processes for preparing alpha olefin polymers having controlled broad molecular weight distributions.

The low pressure polymerization of alpha olefins with catalyst systems composed of a partially reduced, heavy transition metal component and an organometallic reducing component to form high density, high molecular weight, solid, relatively linear polymers is well known. Characteristically such polymerizations are carried out in an inert organic liquid diluent under an inert atmosphere and at relatively low temperatures, e.g., 0° to 100° C, and low pressures, e.g., 0 to 100 psig. Typical transition metal components are the halides, oxyhalides, alkoxides and the like of metals selected from Groups 4b, 5b, 6b and 8 of the Periodic Table of Elements appearing in the Handbook of Chemistry and Physics, 48th ed., Chemical Rubber Company. Common organometallic components include the metal alkyls, metal alkyl halides and dihalides, metal hydrides and similar compounds in which the metals are selected from Groups 1a, 2a and 3a of the Periodic Table of Elements. The alpha olefin polymers produced by low pressure polymerization generally have molecular weights in the range of about 100,000 to 300,000 or even as high as 3,000,000.

It is generally believed that the high molecular weight of the linear olefin polymer is primarily responsible for the polymer's desirable properties, e.g., strength, at relatively high temperatures. Unfortunately, however, these high molecular weight polymers have very high viscosities at temperatures typically used in shaping such polymers, thus making the fabrication operation very difficult if not impossible. As a result of this extreme difficulty of fabrication, shaped articles of such polymers such as wire cable jacketings, etc., generally have objectionably rough surfaces and fissures which crack open when subjected to stress. As a further disadvantage such polymers do not have high swell ratios upon extrusion through a die, thus making the polymers undesirable for blow molding articles such as bottles, etc. Finally such high molecular weight polymers exhibit excessive brittleness at low temperatures.

To overcome these problems which are generally though to be caused by the low melt indexes of the high molecular weight linear polymers, it has been a common practice in the art to alter the conditions of the metal-catalyst polymerization processes in order to increase the amount of low molecular weight polymer formed. In accordance with some practices, molecular weights of the resulting linear polymers are lowered by varying conditions during polymerization such as temperature, pressure, amount of diluent and concentration of catalyst. In more sophisticated methods, molecular weight of such polymers are lowered by adding hydrogen to the reaction vessel during polymerization.

Although lowering the average molecular weight of the linear polymer by one of the above techniques generally facilitates fabrication, it also causes a loss in physical properties such as strength at high temperatures. As a result the polymer, once fabricated, is easier to distort, tear, break, etc., than the higher molecular weight polymers.

In view of the aforementioned deficiencies in linear olefin polymers prepared by the prior art methods, it would be highly desirable to provide a polymerization process for producing linear olefin polymers having both the strength of the high molecular weight polymers and the good processability of the low molecular weight polymers.

SUMMARY OF THE INVENTION

In accordance with this invention linear olefin polymers having both improved processability and improved strength are prepared by an improved process for polymerizing in a polymerization zone an alpha olefin in an inert organic diluent in the presence of a catalytic amount of a catalyst composition formed by reacting an organometallic compound with a compound of transition metal of the fourth period of the Periodic Table of Elements. The improvement comprises the steps of (1) introducing into the polymerization zone, in addition to the above named catalyst, a sufficient amount of a zirconium-containing catalyst composition which is the reaction product of a metal alkyl component with a zirconium compound to give a transition metal/zirconium molar ratio ranging from about 0.5:1 to about 10:1 and (2) polymerizing the alpha olefin at temperatures and pressures sufficient to maintain the resulting linear olefin polymer dissolved in the liquid diluent.

By "linear" polymer is meant that the backbone chain of the macromolecule is substantially non-crosslinked and non-branched, i.e., linear, and includes polymers such as isotactic polymers of propylene, higher 1-alkenes, styrene, etc., wherein the linear main chain has substituent groups attached thereto arising from the substituted ethylene monomer. Also, as used herein, the term "olefin polymers" is meant to include homopolymers, copolymers and interpolymers of alpha olefins.

Linear olefin polymers prepared in accordance with this improved process have relatively broad molecular weight distributions. As a consequence of broad molecular weight distribution, these polymers have much improved processability, particularly at high shear rates which are typical in extrusion. Surprisingly, however, such polymers also have strength at high temperatures equivalent to that of polymers having higher molecular weight averages, but narrower molecular weight distributions. As further advantages, these linear polymers tend to exhibit increased swell upon extrusion through a die and have improved stress crack resistance at both high and low temperatures.

Such polymers are very useful in the fabrication of shaped articles such as cable jacketing, bottles, containers, sheets, films and the like. Such polymers also can be molded by compression or injection techniques to form a wide variety of other articles.

DESCRIPTION OF THE PREFERRED EMBODIMENTS

The improvement of the present invention is employed in a low pressure polymerization process wherein an alpha olefin is polymerized, advantageously in the presence of hydrogen, in a polymerization zone containing an inert diluent and a two-component metal catalyst composition of a type commonly known as a Ziegler-Natta catalyst. Such low pressure processes are commonly carried out under an inert atmosphere and at relatively low temperature and pressure.

Olefins which are suitably polymerized or copolymerized are generally the alpha olefins having from two to 18 carbon atoms. Illustratively, such alpha olefins include ethylene, propylene, butene-1, pentene-1, 3-methylbutene-1, 4-methylbutene-1, hexene-1, octene-1, decene-1, dodecene-1, octadecene-1, and the like. It is understood that such alpha olefins may be copolymerized with other alpha olefins and/or with small amounts, i.e., up to about 10 weight percent based on the polymer, of other ethylenically unsaturated monomers such as butadiene, isoprene, pentadiene-1,3, styrene, α-methyl styrene, ar-methyl styrene, and the like.

The two component metal catalyst composition is the reaction product of (1) an organometallic reducing compound corresponding to the formula $MR_nX_m$ wherein M is a metal of Group 1a, 2a, or 3a of the Periodic Table of Elements, R is an alkyl group having from one to eight carbon atoms, X is hydrogen or halogen, and $n + m$ is a positive whole number corresponding to the number of valence electrons of M wherein $n = 1$, 2 or 3 and $m = 0$, 1 or 2 and (2) a compound of transition metal other than zirconium as specified hereinafter. The reaction product advantageously has a molar ratio of M:transition metal ranging from about 0.5:1 to about 5:1, preferably from about 0.5:1 to 2:1.

Examples of $MR_nX_m$ include the aluminum trialkyls, e.g., aluminum triethyl, aluminum triisobutyl, aluminum tripropyl, aluminum diethyl propyl, and other aluminum trialkyls wherein alkyl has from one to eight carbon atoms; aluminum alkyl hydrides, e.g., aluminum diethyl hydride and aluminum isobutyl dihydride; aluminum alkyl halides, e.g., diethylaluminum chloride, diethylaluminum bromide, ethylaluminum dichloride and the like; magnesium dialkyls; zinc dialkyls; alkali metal alkyls and hydrides; alkali metal aluminum hydrides; and other hydrides and alkyls of Group 1, 2 and 3 metals wherein the alkyl groups contain one to eight carbon atoms. Preferred $MR_nX_m$ are the aluminum trialkyls, especially aluminum triethyl and aluminum triisobutyl, and the aluminum alkyl halides, especially diethylaluminum chloride.

Representative reducible transition metal compounds include the halides, oxyhalides, alcoholates, alkoxides and esters of the Group $4b$, $5b$, $6b$, $7b$ and 8 metals of the fourth period of the Periodic Table of Elements, i.e., titanium, vanadium, chromium, iron, manganese, cobalt and nickel. Examples of such components include reducible titanium halides such as titanium tetrachloride, titanium trichloride, titanium tetrabromide, titanium tetraiodide and the like; reducible vanadium halides and oxyhalides such as vanadium pentachloride and vanadium oxytrichloride; titanium tetramethoxide, titanium triethoxide, tripropoxy-titanium chloride, titanium acetylacetonate, titanium tetraacetate, chromium acetylacetonate, iron acetylacetonate and similar compounds of the above mentioned transition metals. Preferred transition metal compounds are titanium tetrachloride, titanium trichloride and vanadium oxytrichloride.

While the catalyst reaction product can be prepared in a variety of procedures, a simple and an effective method is to add the transition metal component to the organometallic reducing component, or vice versa, preferably in the presence of an inert organic solvent. By way of example of suitable inert organic solvents can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when freed of any olefin compounds and other impurities, and especially those ranging in boiling point up to 600° F. Also included are benzene, toluene, ethylbenzene, cumene, decalin, and the like.

In low pressure processes, i.e., usually up to about 100 atmospheres, polymerization is effected by adding a catalytic amount of the above reaction product to a polymerization zone containing monomer, or vice versa, and subsequently heating the zone to temperatures ranging from −40° to 250° C. It is generally desirable to carry out polymerization in absence of moisture and air. Catalytic amounts of the reaction product can range from as low as 0.01 weight percent based on total weight of monomers charged to as high as 20 weight percent. While preferred amounts vary with the polymerization conditions such as temperature, pressure, solvent, presence of catalyst poisons, etc., generally preferred concentrations of the reaction product range from 0.1 up to about 1 weight percent.

Hydrogen is often employed in low pressure polymerization processes to lower the molecular weight of the result polymer. For the purposes of this invention, it is beneficially employed in concentrations ranging from about 0.001 to about 0.5 mole per mole of monomer. The larger amounts of hydrogen within this range are found to produce generally lower molecular weight polymers. It is to be understood that hydrogen can be added with the monomer stream to the polymerization vessel or separately to said vessel before, during or after addition of the monomer to the polymerization vessel. It should be noted, however, that the presence of hydrogen in conventional low pressure polymerization lowers molecular weight average of polymer and does not affect molecular weight distribution.

The improvement of the present invention comprises the steps of (1) introducing into the polymerization zone, in addition to the transition metal catalyst composition, a sufficient amount of a zirconium catalyst composition to yield a transition metal/zirconium molar ratio ranging from about 0.5:1 to about 10:1 and (2) polymerizing the alpha olefin at temperature and pressure sufficient to maintain the resulting alpha olefin polymer in solution. Temperatures and pressures sufficient to maintain the polymer dissolved in an inert solvent or unreacted monomer generally range from about 130° to about 300° C and from about 0 to about 1,500 pounds per square inch gauge (psig) respectively; preferably from about 140° to about 160° C and from about 100 to about 1,000 psig.

To obtain maximum breadth of molecular weight distribution in the resulting polymer, a transition metal/zirconium molar ratio ranging between about 0.5:1 to about 10:1 is desired, preferably 0.5:1 to 7:1. At lower ratios of transition metal to zirconium, larger amounts of the very high molecular weight polymer are formed. Such polymer products are exceptionally suited for wire and cable applications. At the higher ratios of transition metal to zirconium, the higher molecular weight portion is reduced in proportion and the resultant product is particularly suited to blow molding and the like. Of particular importance, however, is the fact that substantial portions of both very high and low molecular weight polymer are formed at all transition metal/zirconium molar ratios within the specified range of 0.5:1 and 10:1.

The zirconium catalyst composition is a reaction product of (1) a metal alkyl component having the formula $MR_nX_m$ wherein M, R, X, n and m are as described hereinbefore and (2) a zirconium compound, preferably a halide or oxyhalide of zirconium. The molar ratio of M to zirconium advantageously ranges from about 0.5:1 to about 5:1, preferably from about 1:1 to about 2:1. At M:zirconium ratios below 0.5:1 low molecular weight polymer is primarily produced. Above 5:1 the polymer yields are somewhat low.

Examples of $MR_nX_m$ suitable for reaction with the zirconium compound are generally those metal alkyls set forth hereinbefore. For this reaction, $MR_nX_m$ is preferably aluminum trialkyl such as aluminum triethyl and aluminum triisobutyl. It is understood that $MR_nX_m$ need not be the same in the transition metal and zirconium catalyst compositions although it may be.

Preferred zirconium compounds include the trihalides and tetrahalides of zirconium, e.g., zirconium tetrachloride and trichloride, zirconium tetrabromide and tribromide, zirconium tetrafluoride and trifluoride, and zirconium tetraiodide and triiodide; and the oxyhalides of zirconium, e.g., zirconylchloride, zirconylbromide and the like. The procedural steps of the methods for preparing the zirconium catalyst composition are essentially the same as for preparing the above-described transition metal catalyst compositions and are not described further for that reason.

Both the transition metal catalyst composition and the zirconium catalyst composition are sensitive to various poisons, among which may be mentioned oxygen, carbon dioxide, carbon monoxide, acetylenic compounds such as acetylene, vinylacetylene, and the like. For this reason, suitable precautions should be taken to protect the catalyst compositions and the polymerization mixture from excessive contact with such materials. The monomers and diluents or solvents, if used, need not be pure so long as they are reasonably free from poisons. It is desirable to protect both of the catalyst compositions during preparation, storage, and use by blanketing with an inert gas, e.g., nitrogen, argon, or helium.

The monomer or mixture of monomers is contacted with the transition metal and zirconium catalyst compositions in any convenient manner, preferably by bringing the catalyst compositions and monomer together with intimate agitation provided by suitable stirring or other means. It is understood that the zirconium catalyst composition can be introduced previous to or simultaneous with introduction of the transition metal catalyst composition prior to polymerization, subsequent to introduction of the transition metal catalyst composition during polymerization, or portions of the zirconium catalyst composition can be introduced both simultaneous with and subsequent to introduction of the transition metal composition.

Agitation can be continued during the polymerization, or in some instances, the polymerization mixture can be allowed to remain quiescent while the polymerization takes place. In the case of the more rapid reactions with the more active catalysts, means can be provided for refluxing monomer and solvent, if any of the latter is present, and thus remove the heat of reaction. In any event, adequate means should be provided for dissipating the exothermic heat of polymerization. If desired, the monomer can be brought in vapor phase into contact with solid catalyst, in the presence of or absence of liquid solvent. The polymerization can be effected in the batch manner, or in a continuous manner, such as, for example, by passing the reaction mixture through an elongated reaction tube which is contacted externally with suitable cooling medium to maintain desired reaction temperature; or by passing the reaction mixture through an equilibrium overflow reactor, or a series of the same.

The polymer can be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent at lower temperatures, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected at reduced pressure at temperatures below 300° C.

The following examples are given to illustrate the invention and should not be construed as limiting its scope. All parts and percentages are by weight unless otherwise indicated. The symbols $I_2$ and $I_{10}$ represent the melt flow viscosity in decigrams/minute of the polymer measured according to ASTM D–1238–5T(E) and ASTM D–1238–65T(N), respectively. The $I_{10}/I_2$ ratio is a practical measure of the breadth of the molecular weight distribution of the polymer with larger ratios indicating broader molecular weight distributions.

EXAMPLES 1–4

A 0.582-gram portion of zirconium tetrachloride under nitrogen is made into a slurry by the addition of 45 ml of isooctane (dried over $CaH_2$ and deaerated). A 5-ml portion of a 1 molar solution of aluminum triethyl in isooctane is then added to the slurry thereby converting the white zirconium tetrachloride to a brown solid (Al:Zr=2:1). A transition metal catalyst composition is prepared by adding 5 mls of 0.5 molar solution of vanadium oxytrichloride and 5 mls of 1.0 molar solution of aluminum triethyl (Al:V=2:1) in isooctane to a vessel under nitrogen and containing 40 mls of isooctane. Two liters of isooctane (deaerated and dried) is introduced into a one gallon stirred polymerization reactor containing nitrogen and is heated to 150° C. The reactor is vented to approximately 25 psig and 13 psig of hydrogen is added. The reactor is then filled with ethylene to obtain a reactor pressure of 148 psig and ethylene pressure is set at the ethylene source to maintain a pressure of 148 psig throughout the reaction. A 20-ml portion of the zirconium catalyst composition and a 10-ml portion of the vanadium catalyst composition are charged to the reactor, and the reaction temperature is maintained at 150° C for a period of 50 minutes. The reaction is stopped and 70.7 grams of the polymer are recovered, washed with alcohol and dried. The $I_2$ and $I_{10}$ values of the polymer are measured and the $I_{10}/I_2$ ratio are calculated. The results are shown in Table I.

To further exemplify the invention, several polymerization runs (Example Nos. 2, 3 and 4) are carried out essentially according to the above general procedure except that different ratios of the zirconium catalyst composition and the vanadium composition are employed. The $I_2$ and $I_{10}$ values and $I_{10}/I_2$ ratios of the resulting polymers are determined and are also recorded in Table I.

For the purposes of comparison and to particularly point out the advantages of the present invention, two control runs ($C_1$ and $C_2$) are carried out polymerizing ethylene in the presence of hydrogen essentially according to the conditions of Example 1. In $C_1$, however, the only catalyst added to the polymerization recipe is a 20 ml-portion of the zirconium catalyst composition of Example 1. In $C_2$ the only catalyst employed is a 20 ml-portion of the vanadium catalyst composition of Example 1. The resulting polymer is recovered and the $I_2$ and $I_{10}$ values and $I_{10}/I_2$ ratios are determined and recorded in Table I.

TABLE I

| Example No. | Catalyst [1] | Pressure, p.s.i.g. | | | Ti/Zr, mole ratio | Catalyst concentration, millimole | | $I_2$, decig./ min. | $I_{10}$, decig./ min. | $I_{10}/I_2$ |
|---|---|---|---|---|---|---|---|---|---|---|
| | | $C_2H_4$ | $H_2$ | Total | | Zr | Ti | | | |
| 1 | $ZrCl_4$-ATE+$VOCl_3$-ATE | 110 | 13 | 148 | 0.5:1 | 1.0 | 0.5 | 0.12 | 1.75 | 14.6 |
| 2 | $ZrCl_4$-ATE+$VOCl_3$-ATE | 110 | 13 | 148 | 1:1 | 0.75 | 0.75 | 0.32 | 5.85 | 18.3 |
| 3 | $ZrCl_4$-ATE+$VOCl_3$-ATE | 108 | 10 | 146 | 3:1 | 0.25 | 0.75 | 6.72 | 96.2 | 14.3 |
| 4 | $ZrCl_4$-ATE+$VOCl_3$-ATE | 103 | 10 | 148 | 7:1 | 0.125 | 0.875 | 9.68 | 108 | 11.2 |
| $C_1$* | $ZrCl_4$-ATE | 104 | 13 | 144 | | 1.0 | | 0.04 | 0.42 | 10.5 |
| $C_2$* | $VOCl_3$-ATE | 104 | 13 | 144 | | | 1.0 | >100 | >8,500 | ~8.5 |

[1] ATE = Aluminum triethyl.   *Not an example of the invention.

As evidenced by the $I_{10}/I_2$ ratios of Table I, the polyethylenes prepared by the improved process of this invention have substantially broader molecular weight distributions than those prepared by using either of the zirconium or vanadium catalyst compositions alone.

EXAMPLE 5

Ethylene is polymerized according to Example 1 except that titanium tetrachloride-aluminum triethyl (Al:Ti=2:1) is substituted for vanadium oxytrichloride-aluminum triethyl. The polymer is recovered and the $I_2$ and $I_{10}$ values and $I_{10}/I_2$ ratio are determined and recorded in Table II.

For the purposes of comparison a control run ($C_3$) is carried out essentially according to Example 5 except only the titanium catalyst composition is employed as the catalyst. The polymer is recovered and tested and results are recorded in Table II.

As evidenced by the $I_{10}/I_2$ ratios in Table II, the polymer prepared by the improved process of this invention exhibited a broader molecular weight distribution than the polymer prepared by employing only the titanium catalyst composition.

TABLE II

| Example No. | Catalyst | Pressure, p.s.i.g. $C_2H_4$ | Pressure, p.s.i.g. $H_2$ | Pressure, p.s.i.g. Total | Ti/Zr, molar ratio | Catalyst concentration, millimole Zr | Catalyst concentration, millimole Ti | $I_2$, decig./min. | $I_{10}$, decig./min. | $I_{10}/I_2$ |
|---|---|---|---|---|---|---|---|---|---|---|
| 5 | $ZrCl_4$-ATE¹+$TiCl_4$-ATE¹ | 102 | 20 | 148 | 0.5/1 | 1.0 | 0.5 | 2.08 | 30.9 | 14.8 |
| C₃* | $TiCl_4$-ATE¹ | 102 | 20 | 148 | | | 1.0 | 0.40 | 4.25 | 10.6 |

¹ ATE = Aluminum triethyl.   *Not an example of the invention.

What is claimed is:

1. In a process for polymerizing in a polymerization zone an alpha olefin having from two to 18 carbon atoms in the presence of a catalytic amount of a transition metal catalyst composition formed by reacting an organometallic reducing compound corresponding to the formula $MR_nX_m$ wherein M is a Group 1a, 2a or 3a metal of the Periodic Table of Elements, R is hydrogen or an alkyl group having from one to eight carbon atoms, X is halogen, $n + m$ is a positive whole number corresponding to the number of valence electrons of M, $n$ is 1, 2 or 3 and $m$ is 0, 1 or 2, with a reducible compound of titanium or vanadium; the improvement which comprises (1) introducing into the polymerization zone, in addition to said transition metal catalyst composition, a sufficient amount of a zirconium catalyst composition which is a reaction product of (a) an organometallic reducing compound corresponding to the formula $MR_nX_m$ where M is a Group 1a, 2a or 3a metal, R is hydrogen or an alkyl group having from one to eight carbon atoms, X is halogen, $n + m$ is a positive whole number corresponding to the number of valence electrons of M, $n$ is 1, 2 or 3 and $m$ is 0, 1 or 2 with (2) a reducible zirconium compound to yield a reducible compound/zirconium molar ratio ranging from about 0.5:1 to about 10:1 and (2) polymerizing the alpha olefin at temperatures and pressures sufficient to maintain the resulting polymer in solution thereby providing an alpha olefin polymer having broad molecular weight distribution.

2. The improvement according to claim 1 wherein the zirconium compound is zirconium tetrachloride.

3. The improvement according to claim 1 wherein hydrogen is present in concentration in the range of from about 0.001 to about 0.5 mole per mole of the alpha olefin.

4. The improvement according to claim 1 wherein $MR_nX_m$ of the transition metal catalyst composition is an aluminum trialkyl.

5. The improvement according to claim 1 wherein the reducible compound is a reducible titanium halide.

6. The improvement according to claim 1 wherein the reducible compound is a reducible vanadium oxyhalide.

7. The improvement according to claim 1 wherein $MR_nX_m$ of the zirconium catalyst composition is an aluminum trialkyl.

8. The improvement according to claim 1 wherein the temperature is within a range from about 130° to about 300° C.

9. The improvement according to claim 1 wherein the pressure is within a range from about 100 to about 1,000 psig.

10. The improvement according to claim 1 wherein the reducible compound/zirconium molar ratio is within a range from about 0.5:1 to about 7:1.

11. The improvement according to claim 1 wherein the molar ratio of titanium or vanadium to M of the transition metal catalyst composition ranges from about 0.5:1 to about 5:1 and the molar ratio of zirconium to M of the zirconium catalyst composition is about 0.5:1 to about 5:1.

12. In a process for polymerizing in a polymerization zone an alpha olefin selected from the group consisting of ethylene, propylene and butene-1 in the presence of a catalytic amount of a transition metal catalyst composition formed by reacting an organometallic reducing compound selected from the group consisting of aluminum trialkyls, aluminum alkyl hydrides, and aluminum alkyl halides wherein alkyl has from one to eight carbon atoms and halide is chloride or bromide with a reducible compound of a transition metal selected from the group consisting of titanium and vanadium; the improvement according to claim 11 which comprises (1) introducing into the polymerization zone, in addition to said transition metal catalyst composition, a sufficient amount of a zirconium catalyst composition which is a reaction product of (a) an organo-metallic reducing compound selected from the group consisting of aluminum trialkyls, aluminum alkyl hydrides and aluminum alkyl halides wherein alkyl has from one to eight carbon atoms and halide is chloride or bromide with (b) a reducible zirconium compound to yield a transition metal/zirconium molar ratio ranging from about 0.5:1 to about 10:1 and (2) polymerizing the alpha olefin in the presence of from about 0.001 to about 0.5 mole of hydrogen per mole of alpha olefin at temperatures and pressures sufficient to maintain the resulting polymer in solution thereby providing an alpha olefin polymer having broad molecular weight distribution.

13. In a process for polymerizing ethylene in the presence of a catalytic amount of a transition metal catalyst composition formed by reacting aluminum triethyl with a reducible transition metal compound selected from the group consisting of titanium tetrachloride and vanadium oxychloride; the improvement according to claim 11 which comprises (1) introducing into the polymerization zone, in addition to said transition metal catalyst composition, a sufficient amount of a zirconium catalyst composition which is a reaction product of (a) aluminum triethyl with zirconium tetrachloride to yield a transition metal/zirconium molar ratio ranging from about 0.5:1 to about 10:1 and (2) polymerizing the alpha olefin in the presence of from about 0.001 to about 0.5 mole of hydrogen per mole of alpha olefin at temperatures and pressures sufficient to maintain the resulting polymer in solution thereby providing an alpha olefin polymer having broad molecular weight distribution.

14. In a process for polymerizing in a polymerization zone an alpha olefin selected from the group consisting of ethylene, propylene and butene-1 in the presence of a catalytic amount of a transition metal catalyst composition formed by reacting an organometallic reducing compound selected from the group consisting of aluminum trialkyls and diethyl aluminum chloride one to eight carbon atoms with a reducible compound of a transition metal selected from the group consisting of titanium and vanadium wherein the aluminum/transition metal molar ratio is in the range from about 0.5:1 to about 5:1; the improvement according to claim 11 which comprises (1) introducing into the polymerization zone, in addition to said transition metal catalyst composition, a sufficient amount of a zirconium catalyst composition which is a reaction product of (a) an organometallic reducing compound selected from the group consisting of aluminum trialkyls, and diethyl aluminum chloride wherein alkyl has from 1 to 8 carbon atoms with (b) a reducible zirconium compound wherein the aluminum/zirconium molar ratio is in the range from about 0.5:1 to about 5:1 to yield a transition metal/zirconium molar ratio ranging from about 0.5:1 to about 10:1 and (2) polymerizing the alpha olefin in the presence of from about 0.001 to about 0.5 mole of hydrogen per mole of alpha olefin at temperatures and pressures sufficient to maintain the resulting polymer in solution thereby providing an alpha olefin polymer having broad molecular weight distribution.

* * * * *

PO-1050
(5/69)

UNITED STATES PATENT OFFICE
CERTIFICATE OF CORRECTION

Patent No. 3,678,025      Dated 18 July 1972

Inventor(s) George B. Birrell

It is certified that error appears in the above-identified patent and that said Letters Patent are hereby corrected as shown below:

Column 1, line 46, change "though" to --thought--.

Column 7, line 36, delete "(2)" and insert --(b)--.

Column 8, line 53, insert --wherein alkyl has from-- between the words "chloride" and "one".

Signed and sealed this 9th day of January 1973.

(SEAL)
Attest:

EDWARD M. FLETCHER, JR.
Attesting Officer

ROBERT GOTTSCHALK
Commissioner of Patents